US011528908B2

(12) United States Patent
Wang et al.

(10) Patent No.: US 11,528,908 B2
(45) Date of Patent: Dec. 20, 2022

(54) ACARICIDE AND APPLICATION THEREOF

(71) Applicants: CHONGQING LINGSHI AGRICULTURAL TECHNOLOGY CO., LTD., Chongqing (CN); Shuliang Wang, Chongqing (CN)

(72) Inventors: Shuliang Wang, Chongqing (CN); Zhenlun Li, Chongqing (CN)

(73) Assignees: CHONGQING LINGSHI AGRICULTURAL TECHNOLOGY CO., LTD., Chongqing (CN); Shuliang Wang, Chongqing (CN)

( * ) Notice: Subject to any disclaimer, the term of this patent is extended or adjusted under 35 U.S.C. 154(b) by 386 days.

(21) Appl. No.: 16/633,142

(22) PCT Filed: Nov. 9, 2018

(86) PCT No.: PCT/CN2018/114804
§ 371 (c)(1),
(2) Date: Jan. 22, 2020

(87) PCT Pub. No.: WO2019/140990
PCT Pub. Date: Jul. 25, 2019

(65) Prior Publication Data
US 2020/0196608 A1    Jun. 25, 2020

(30) Foreign Application Priority Data

Jan. 17, 2018   (CN) .......................... 201810043269.6

(51) Int. Cl.
| | | |
|---|---|---|
| A01N 55/00 | (2006.01) | |
| A01N 41/10 | (2006.01) | |
| A01N 25/30 | (2006.01) | |
| A01N 53/00 | (2006.01) | |
| A01N 37/34 | (2006.01) | |
| A01N 43/12 | (2006.01) | |
| A01N 43/56 | (2006.01) | |
| A01N 43/58 | (2006.01) | |
| A01N 43/76 | (2006.01) | |
| A01N 43/90 | (2006.01) | |
| A01N 47/06 | (2006.01) | |
| A01N 47/14 | (2006.01) | |
| A01N 47/34 | (2006.01) | |

(52) U.S. Cl.
CPC ............ *A01N 55/00* (2013.01); *A01N 41/10* (2013.01)

(58) Field of Classification Search
CPC ........ A01N 55/00; A01N 41/10; A01N 25/30; A01N 53/00; A01N 37/34; A01N 37/52; A01N 43/12; A01N 43/56; A01N 43/58; A01N 43/76; A01N 43/90; A01N 47/06; A01N 47/14; A01N 47/34
See application file for complete search history.

(56) References Cited

U.S. PATENT DOCUMENTS

| 5,504,054 | A | * | 4/1996 | Murphy ................. A01N 55/00 504/362 |
| 6,103,763 | A | | 8/2000 | Horst |
| 2010/0120870 | A1 | | 5/2010 | Liu et al. |
| 2011/0028528 | A1 | * | 2/2011 | Ishihara ................. A01N 25/04 514/398 |

FOREIGN PATENT DOCUMENTS

| CN | 103355288 A | * | 10/2013 |
| CN | 103975947 A | | 8/2014 |
| CN | 104286020 A | | 1/2015 |
| CN | 104757001 A | | 7/2015 |
| CN | 104757010 A | | 7/2015 |
| CN | 104757011 A | | 7/2015 |
| CN | 105176049 A | | 12/2015 |
| CN | 106212491 A | | 12/2016 |
| CN | 107136062 A | | 9/2017 |
| CN | 107136063 A | | 9/2017 |
| CN | 107306947 A | | 11/2017 |
| CN | 108184835 A | | 6/2018 |
| FR | 2636503 A1 | | 3/1990 |
| JP | S5188626 A | | 8/1976 |
| WO | 2014187847 A1 | | 11/2014 |

OTHER PUBLICATIONS

CAS 67674-67-3 Ch Em Abstracts Service 2022.pdf.*
N-380 27306-78-1 CAS Chemical Abstract Service 2022.pdf.*
CN 103355288 A Proquest English Machine Translation 2022 p. 1-18.pdf.*
CN 107136062 A Proquest English Machine Translation 2022 p. 1-18.pdf.*
Haviland, D., Mitocide Table Kern County 2005 p. 1-2.pdf.*
Umar Abulimu et al., Recent Progress of Mite Research in China, Bulletin of Biology, 2009, pp. 12-13, 44(4).
Chen Xia et al., Effects of Nine Pesticides against the Nymphs and Eggs of Neoseiuluscucumeris (Oudemans), Chinese Journal of Biological Control, 2011, 43-49, 27(1).
Xin Jieliu, Applied Acarology, Fudan University Press, 1998, pp. 163-205, Shanghai.
Christopher Tipping et al., Efficacy of Silwet L-77 Against Several Arthropod Pests of Table Grape, Journal of Economic Entomology, Feb. 2003, pp. 246-250, vol. 96, No. 1.

(Continued)

*Primary Examiner* — John M Mauro
(74) *Attorney, Agent, or Firm* — Bayramoglu Law Offices LLC

(57) ABSTRACT

An acaricide includes a surfactant and a penetrant. The acaricide has good, quick-acting effects, long effective period, safe and environment friendly, good stability, and a wide range of applications. The acaricide is not only capable of being used for exterminating agricultural and forest mites, but is also capable of being used for exterminating medical and animal husbandry mites. The acaricide has few to none drug residues and has good stability in acaricidal effect. Moreover, the acaricide is convenient to use, and may be used either alone or added directly into other insecticides.

7 Claims, No Drawings

(56) References Cited

OTHER PUBLICATIONS

R. S. Cowles et al., "Inert" Formulation Ingredients with Activity: Toxicity of Trisiloxane Surfactant Solutions to Twospotted Spider Mites (*Acari tetranychidae*), J. Econ. Entomol., Jan. 2000, pp. 180-188, vol. 93, No. 2.

\* cited by examiner

ACARICIDE AND APPLICATION THEREOF

CROSS REFERENCE TO THE RELATED APPLICATIONS

This application is the national phase entry of International Application No. PCT/CN2018/114804, filed on Nov. 9, 2018, which is based upon and claims priority to Chinese Patent Application No. 201810043269.6, filed on Jan. 17, 2018, the entire contents of which are incorporated herein by reference.

TECHNICAL FIELD

The present disclosure belongs to the technical field of insecticides characterized by surfactants, and more specifically relates to an acaricide and an application thereof.

BACKGROUND

Mites are animals belonging to the phylum Arthropoda, the class Arachnida and the subclass Acari, which have high diversity in regards to morphological structures, living habits, and habitats, among others. Mites are widely distributed, reproduce quickly, and can reproduce by parthenogenesis, which have a variety of lifestyles, and have strong adaptability to various environments ("Applied Acarology", Xin Jieliu, Shanghai: Fudan University Press, 1998, pages 163-205, publication date: Dec. 31, 1998).

According to economic significance, mites can be classified into one of three categories: agricultural and forestry mites, medical and animal husbandry mites, and environmental mites. The agricultural and forestry mites include mites living on plants and animal or plant products. According to feeding habits, the agricultural and forestry mites can be classified into phytophagous mites and predator mites. The phytophagous mites mainly include spider mites (Tetranychidae), eriophyoid mites (Eriophyoidea), acaroid mites (Acaroidea), tarsonemid mites (Tarsonemidae), *Pyemotes* (Pyemotidae), Pygmephoridae, *Penthaleus major* (Penthaleidae), *Histiostoma* (Histiostomatidae), *Rhizoglyphus* and Oribatid mites (Oribatida), among others. The phytophagous mites cause damage by piercing-sucking or chewing, and most of them are destroyers of human produced goods and agriculture, which can cause human diseases, chlorotic spots, leaf yellowing and shedding, deformities of branches and leaves, chewing of storage items, fungi spreading, and degeneration of storage items. The predator mites mainly include phytoseiid mites (Phytoseiidae), stigmaeid mites (Stigmaeidae), Ameroseius (Ameroseiidae), macrochelid mites (Maerochelidae), hemisarcoptid mites (Hemisarcoptidae), Cunaxidae, Bdelloidea, cheyletid mites (Cheyletidae), Trombidiidae and anystid mites (Anystidae), among others. The predator mites prey on or parasitize other arthropods, such as mites and insects. Most of the predator mites are used as biological control agents. The medical and animal husbandry mites refer to all kinds of mites that can cause animal diseases, including the mites that parasitize the body of humans or domesticated animals and reside in the living places of humans and domesticated animals, such as tick (Ixodoidea), itch mites (Sarcoptidae), follicle mites (Demodicidae), chigger mites (Trombiculidae), house-dust mites (Dermatophagoides), bee mites (Tarsonemidae), scab mites (Psoroptidae), feather mites (Analgoidea), Myobiidae, and Oribatid mites (Oribatida), among others. The medical and animal husbandry mites can cause diseases including dermatitis, allergic dermatitis, allergic rhinitis, allergic asthma, hemorrhagic fever, Lyme disease, Q fever, tick-borne encephalitis, plague, pruritus, acne, scabies, rosacea caused by demodex, pruritic external auditory canals caused by demodex, and blepharitis caused by demodex, among others. They can also transmit pathogenic microorganisms such as bacteria, viruses and Rickettsia, as well as other diseases such as tsutsugamushi disease, dermatitis caused by chigger mites, sand-mite fever, Q fever, scrubtyphus and scrub forest spotted fever, among others. The environmental mites refer to the mites living in the soil and they play a role in decomposition, mainly oribatid mites and acaroid mites. Most of the environmental mites are scavengers, which feed on decaying animals and plants and act as important decomposers in the soil ecological environment ("Recent Progress of Mite Research in China", Umar Abulimu et al., Bulletin of Biology, 2009, 44(4): 12-13, Publication Date: Dec. 31, 2009).

Agricultural and forest mites are key pests on agricultural and forestry crops, widely spreading across fields, causing local disasters, and has become a worldwide issue effecting agricultural production ("Effects of Nine Pesticides against the Nymphs and Eggs of Neoseiulus cucumeris (Oudemans)," Chen Xia et al., Chinese Journal of Biological Control, 2011, 27(1): 44, publication date: Feb. 28, 2011). The agricultural and forestry mites have caused harm in successive years in some areas where citrus, cotton, vegetables and other crops are grown, frequently resulting in a large-scale reduction in production of more than 30% of the area or even no harvest at all. Among agricultural and forest mites, adult and nymph mites mainly cluster on the back of the upper young leaves and the middle healthy leaves of plants. During the flourishing period of mites, a thin layer of fibrous web may be formed on the plants, and a large number of eggs, nymphs, and larvae of mites are attached to the fibrous web, which seriously affects the growth and development of the plants. The agricultural and forest mites pierce leaf tissues, mainly through piercing-sucking mouth parts, and feed on the chloroplasts and cell fluid of palisade cells, thus causing harm to plants. The destruction of plant cells may cause changes in plant physiological functions, resulting in a series of damage to plant organisms, including water balance disorders, photosynthesis process impairment, and effects of toxins or growth regulators. In the early stage of the damage, the leaf surface of the host sporadically generates chlorotic spots, and then the leaves are covered with white or pale spots, which seriously affects the photosynthesis of crops, destroys the normal physiological functions of host plants, and thus weakens the growth potential of the host plants. Slight damage may cause petal dropping, fruit dropping or fruit malformation, and plant premature senescence, therein significantly reducing the yield. Serious damage may result in the death of whole plants, thus causing serious economic losses. The annual loss caused by mites in the world is massive. For example, when cotton seedlings suffer damage from mites, all the leaves may fall, causing the cotton plants to become culms without any leaves; if the cotton plant is severely damaged in the middle and late stages of growth, the number of buds and bolls decreases, the boll opening stage is prolonged, the cotton yield decreases, and the fiber length is shortened. When corn plants suffer damage from mites, chlorotic plaque of needle-size appears in the early stage of the leaf; and in severe cases, the entire leaf turns yellow and wrinkled until it dries up and falls off. Then the grains become relatively small, resulting in a decrease of yield or even no harvest at all. When the camellia sinensis suffer damage from mites, the leaves turn brown after chlorosis and become hard and thick.

The finished tea has a strong burnt taste, turbid soup color and peculiar smell, resulting in a serious decline in the yield and quality. When citrus suffers damage from mites, it produces necrotic spots on the young shoots, leaves and fruit epidermis, thus destroying the nutrition of the fruit tree, and restricting the nutrient growth of the fruit tree, thus resulting in a significant decline in the yield and quality of the citrus. Therefore, the prevention and control of mites has become one of the important tasks for agricultural production. At present, the agricultural control of mites mainly depends on the control methods of using chemical agents, such as ivermectin preparations, pyrethroid preparations, miticides, chumante, bromomite, pyridaben, benzyl benzoate, and fumigants, among others. ("Recent Progress of Mite Research in China", Umar Abulimu et al., Bulletin of Biology, 2009, 44(4): 12-13, Publication Date: Dec. 31, 2009). However, the long-term, frequent and large amount use of chemical pesticides makes mites prone to develop resistance and cross-resistance to most miticides. In addition, the development of resistance to the chemical pesticide is rapid. Therefore, the problem of chemical pesticide resistance has become increasingly serious.

Current research shows that, to varying degrees, agricultural and forest mites have developed resistance to miticides such as organophosphorus, organochlorines, pyrethroids, mitochondrial electron-transport-chain inhibitors, and novel quaternary acids. In order to prevent and control the damage from mites, the concentration, dose and frequency of the pesticides in application have been increased, and the control frequency is up to 10-30 times per year. For example, in an adult citrus orchard in southern China, the annual application of pesticides for mite control reaches up to 30 times per year. The cost of the prevention and control accounts for more than 80% of the total agricultural control cost, which greatly increases the cost of agricultural production. In addition, these chemical pesticides also kill a large number of the natural enemies of mites, causing them to become more rampant, which becomes a vicious cycle and brings with it serious food safety problems.

Meanwhile, the problem of pesticide residues is severe, which not only causes serious food safety risks, but also causes heavy pollution to the surrounding natural environment. This type of pollution is undoubtedly damaging to the human living environment, greatly effecting the ecological security, and seriously restricting the sustainable and healthy development of industries such as grain, cotton, fruits, and vegetables, among others.

In order to solve the problems mentioned above, biologically-derived miticides have been developed. At present, the existing biologically-derived miticides include avermectin, alkaloids, flavonoids, citrates, and plant essential oils, among others. These biologically-derived miticides have numerous advantages such as non-toxicity, less pollution or even pollution-free, unlikely to induce drug resistance and high efficiency, among others. They are also highly valued and focused. However, compared with chemical pesticides, the biologically-derived miticides have poor acaricidal effect, are slow acting, have a short validity period, have a lack of acaricidal effect stability, and a narrowly controlled range. The drug resistance of mites has been continuously improved after long-term application. For example, in recent years, due to the high-frequency use of avermectin, the resistance of mites to avermectin has continued to increase, and the control effect has gradually decreased.

Therefore, SK Company in South Korea has developed a petroleum oil as a miticide. The petroleum oil can form an oil film on pest bodies to close their stomata, thereby exterminating the pests. Moreover, the pests do not develop resistance to the petroleum oil easily. Mixing the petroleum oil with other pesticides before application can improve the pesticide effect, extend the effective duration, prevent the cloud point of the liquid pesticide from evaporating too quickly, reduce the drift of cloud point, help in dissolving the wax layer on the surface of the pests, and effectively protect natural enemies, thereby directly killing and repelling some small pests and harmful mites. However, this petroleum oil has a limited acaricidal range, which means it cannot be applied at the flowering stage, young fruit stage and fruit maturity stage of fruit trees, thus greatly limiting the scope of application.

SUMMARY

In view of this, the objective of the present invention is to provide an acaricide with a wide range of applications.

The present inventor further found that using the petroleum oil developed by the SK Company in South Korea can achieve acaricidal effects when a larger concentration (100-200 folds dilution) is applied, which is costly.

Realizing the above objective, the technical solution of the present invention is provided as follows.

An acaricide, including: a surfactant and a penetrant.

The acaricidal activity refers to the capability of a substance to increase the mortality or inhibit the growth rate of ectoparasites belonging to the class Arachnida and the subclass Acari.

The present inventor found that the use of a drug formed by combining the surfactant and the penetrant for exterminating mites has the characteristics of a good quick-acting effect, a long effective period, a wide application range, no or less drug residues, and good stability of acaricidal effect.

The acaricide of the present invention has a wide range of applications, and can be applied at the flowering stage, young fruit stage and the fruit maturity stage of fruit trees. Moreover, the acaricide is not only capable of being used for killing agricultural and forest mites, but is also capable of being used for killing medical and animal husbandry mites.

Further, the surfactant is an ethoxy-modified trisiloxane.

The ethoxy-modified trisiloxane is widely used as a spray improver and synergist, which has a certain acaricidal effect only at a high concentration (content ranging from 0.667 g/L to 1.0 g/L), and the acaricidal rate for 72 hours is about 30%, therefore, the ethoxy-modified trisiloxane cannot be used as an acaricide alone, and at this concentration, plants are prone to undergo serious pesticide damage.

A further improvement is, the penetrant is sodium dioctyl sulfosuccinate.

A further improvement is, the acaricide includes the ethoxy-modified trisiloxane and sodium dioctyl sulfosuccinate.

A further improvement is, the mass ratio of the surfactant to the penetrant is 1:0.5-2.

The combination of the surfactant and the penetrant according to the above ratio can further improve the acaricidal effect.

A further improvement is, the mass ratio of the surfactant to the penetrant is 1:0.7-1:1.5.

A further improvement is, the mass ratio of the surfactant to the penetrant is 1:0.8-1:1.2.

For the acaricide according to the present invention, those skilled in the art can further add a transpiration inhibitor, such as glycerol, vegetable oil, mineral oil, and methylated vegetable oil, to the acaricide according to the specific application requirements. The above-mentioned transpiration inhibitor is a clear concept for those skilled in the art.

Another objective of the present invention is to provide an application of the acaricide for exterminating mites.

The acaricide may be used alone and has a fast and good killing effect on mite eggs, larvae, nymphs and adults at a content of 0.05 wt %-0.10 wt %.

The acaricide may further be added directly to insecticides such as amitraz, avermectin, etoxazole, fenpyroximate, pyridaben, hexythiazox, spirotetramat, spirodiclofen, fenpropathrin, and bifenthrin, thereby achieving a synergistic acaricidal effect. When a content of the acaricide is 0.02 wt %-0.05 wt %, the mites can be quickly killed.

Another objective of the present invention is to provide an application of the acaricide in fertilizers, pesticides, plant growth regulators, and herbicides by spraying.

In the fertilizers, pesticides, plant growth regulators, and herbicide used by spraying, when a content of the acaricide is 0.02 wt %-0.10 wt %, the fertilizer efficiency and acaricidal efficacy can be significantly improved.

The advantages of the present invention are as follows:

The acaricide of the present invention has good quick-acting effects that disables the mites and they will lose their activity ability within 10 minutes after spraying.

The acaricide of the present invention has a long operative period. After spraying the acaricide at a 1000-fold dilution once, mites will not break out for 30 days. The acaricide of the present invention has a wide range of application, which is not only capable of being used for exterminating agricultural and forest mites, but is also capable of being used for exterminating medical and animal husbandry mites. Moreover, the acaricide of the present invention can be applied at the flowering stage, young fruit stage and the fruit maturity stage of fruit trees, and has the characteristics of good quick-acting effect, long effective period, wide application range, less to no drug residues, and good stability of the acaricidal effect.

The acaricide of the present invention is safe and environmentally friendly, causing few to no drug residues.

The acaricide of the present invention has good stability in the acaricidal effect.

The acaricide of the present invention is convenient to use and can be used alone, which has a fast and good extermination effect on eggs, larvae, nymphs and adults of mites; and can further be added directly to other insecticides to quickly exterminate mites.

The use of the acaricide of the present invention in spray-applied fertilizers, pesticides, plant growth regulators, and herbicides can significantly improve the fertilizer effect and acaricidal efficacy.

DETAILED DESCRIPTION OF THE EMBODIMENTS

The embodiments described here, are to better illustrate the contents of the present invention. However, the contents of the present invention are not limited to the embodiments. Therefore, any non-essential improvements and modifications made to the embodiments by those skilled in the art based on the foregoing contents of the present disclosure, still fall within the protective scope of the present invention.

Hereinafter, the ethoxy-modified trisiloxanes were Agricultural Silicone 248 purchased from Zhejiang Xinnong Chemical Co., Ltd. (Active ingredient content>99%). Sodium dioctyl sulfosuccinate was purchased from Sunda Chemical (Nantong) Co., Ltd., with the active ingredient content of 50 wt % (containing 50 wt % water) or 75 wt % (containing 17 wt % water and 8 wt % ethanol). 1.8% avermectin emul-sifiable concentrate (EC) was purchased from Shandong Zouping Pesticide Co., Ltd. 20% pyridaben wettable powder (WP) was purchased from Jiangsu Kesheng Group Co., Ltd.; 22.4% SC spirotetramat was purchased from Bayer CropScience (China) Co., Ltd.; 110 g/L etoxazole suspension concentrate (SC) was purchased from Sumitomo Chemical Shanghai Co., Ltd. Fenpropathrin+hexythiazox (fenpropathrin 5.0%, and hexythiazox 2.5%) was purchased from Qingdao Kaiyuanxiang Chemical Co., Ltd. Abamectin+fenpropathrin (abamectin 0.1%, and fenpropathrin 1.7%) was purchased from Jinan Saipu Industrial Co., Ltd.; amitraz (200 g/L) was purchased from Qingdao Haina Biotechnology Co., Ltd. 72% Cymoxanil+mancozeb was purchased from Shanghai DuPont Agrochemical Co., Ltd.

Embodiment 1

Acaricide: the sodium dioctyl sulfosuccinate with an active ingredient content of 50 wt % was vacuum-dried at a temperature of 140° C. (vacuum degree 10 kPa) for 4 hours, and then cooled to room temperature. Subsequently, the ethoxy-modified trisiloxane was mixed with the solid obtained after cooling in a mass ratio of 1:0.5, and then stirring was performed until the solid is dissolved completely to obtain the acaricide.

Embodiment 2

Acaricide: the sodium dioctyl sulfosuccinate with an active ingredient content of 75 wt % was vacuum-dried at a temperature of 140° C. (vacuum degree 4 kPa) for 2 hours, and then cooled to room temperature. Subsequently, the ethoxy-modified trisiloxane was mixed with the solid obtained after cooling in a mass ratio of 1:0.7, and then stirring was performed at 50° C. until the solid is dissolved completely to obtain the acaricide.

Embodiment 3

Acaricide: the sodium dioctyl sulfosuccinate with an active ingredient content of 75 wt % was vacuum-dried at a temperature of 140° C. (vacuum degree 6 kPa) for 3 hours, and then cooled to room temperature. Subsequently, the ethoxy-modified trisiloxane was mixed with the solid obtained after cooling in a mass ratio of 1:0.9, and then stirring was performed at 60° C. until the solid is dissolved completely to obtain the acaricide.

Embodiment 4

Acaricide: the ethoxy-modified trisiloxane was mixed with the sodium dioctyl sulfosuccinate having an active ingredient content of 75 wt % according to a mass ratio of 1:2, and was then stirred and mixed evenly to obtain the acaricide.

Embodiment 5

Acaricide: the ethoxy-modified trisiloxane was mixed with the sodium dioctyl sulfosuccinate having an active ingredient content of 75 wt % according to a mass ratio of 1:2.67, and then stirred and mixed evenly to obtain the acaricide.

Acaricidal Effect Performance Test

According to the Pesticide-Guidelines for the field efficacy trials, two citrus trees at flowering stage were randomly selected from each treatment group in the same orchard. The measurement was repeated 4 times for each treatment group, and the average value of mite counts for the 4 measurements in the field was used as the final result. The acaricides prepared in embodiments 1-5 were diluted 1000 folds, 1.8% abamectin EC was diluted 2000 folds, 20% pyridaben WP was diluted 2000 folds, 22.4% spirotetramat SC was diluted 4000 folds, 110 g/L etoxazole SC was diluted 5000 folds, and water was used as a control. Before spraying and 3, 10, 15, 20, 30 days after spraying, 25 leaves were randomly selected from each orchard, and the number of live mites in each treatment group was counted. SPSS 19.0 was used for variance analysis and Fisher's least significant difference (LSD) multiple comparison analysis of the data. The results are shown in Table 1.

folds on citrus red mites was tested. The control efficacies of the insecticide consisting of a 1000-fold dilution of fenpropathrin+hexythiazox (fenpropathrin 5.0%, and hexythiazox 2.5%) and a 3000-fold dilution of the acaricide prepared in embodiment 3, the insecticide consisting of a 1000-fold dilution of fenpropathrin+hexythiazox (fenpropathrin 5.0%, and hexythiazox 2.5%) and a 4000-fold dilution of the acaricide prepared in embodiment 3, and the insecticide consisting of a 1000-fold dilution of fenpropathrin+hexythiazox (fenpropathrin 5.0%, and hexythiazox 2.5%) and a 5000-fold dilution of the acaricide prepared in embodiment 3 on citrus red mites were tested.

The specific test method is as follows. Two sugar orange trees at fruit maturity stage were randomly selected from

TABLE 1

Control efficacy on citrus mites

| Treatment | Cardinal number before administration | 3$^{rd}$ day | | 10$^{th}$ day | | 15$^{th}$ day | | 20$^{th}$ day | | 30$^{th}$ day | |
|---|---|---|---|---|---|---|---|---|---|---|---|
| | | Number of mites | Control efficacy/% | Number of mites | Control efficacy/% | Number of mites | Control efficacy/% | Number of mites | Control efficacy/% | Number of mites | Control efficacy/% |
| Acaricide 1000× in Embodiment 1 | 148 | 0 | 100aA | 0 | 100aA | 0.75 | 99.49aA | 4.75 | 96.79abA | 8.75 | 94.09bAB |
| Acaricide 1000× in Embodiment 2 | 176 | 0.5 | 99.72aA | 0 | 100aA | 0 | 100aA | 3.25 | 98.15aA | 6.5 | 96.31aA |
| Acaricide 1000× in Embodiment 3 | 135 | 0 | 100aA | 0 | 100aA | 0 | 100aA | 8.5 | 93.70bB | 5.5 | 95.93abA |
| Acaricide 1000× in Embodiment 4 | 142 | 0 | 100aA | 0.5 | 99.67aA | 0.25 | 99.8aA | 10.75 | 92.27bcB | 7 | 93.97bcAB |
| Acaricide 1000× in Embodiment 5 | 155 | 0 | 100aA | 0 | 100aA | 0.5 | 99.68aA | 4.25 | 97.26aA | 3.75 | 97.58aA |
| 1.8% EC abamectin 2000× | 160.25 | 0.5 | 99.83aA | 3 | 99.02abA | 5.75 | 97.18bA | 15.5 | 91.03cB | 10.75 | 92.2cB |
| 20% WP pyridaben 2000× | 63 | 3 | 95.26bB | 2.75 | 95.27cB | 3 | 94.61cB | 3.5 | 92.4bcB | 4.75 | 90.21dB |
| 22.4% SC spirotetramat 4000× | 93 | 9.5 | 92.45cB | 2.25 | 97.87bAB | 1.5 | 98.55abA | 6.5 | 93.08bB | 4.25 | 94.37bAB |
| 110 g/LSC etoxazole 5000× | 120 | 7.75 | 94.89bB | 1.25 | 99.71aA | 0 | 100aA | 2 | 98.72aA | 2.75 | 95.49abA |
| Water control | 237.75 | 212.5 | 10.62dC | 186.5 | 21.56dC | 196.75 | 17.24dC | 154.5 | 35.02dC | 168.5 | 29.13eC |

Note:
Different lowercase letters in the same column indicate a significant difference (P < 0.05), and different uppercase letters in the same column indicate a highly significant difference (P < 0.01); 1000×, 2000×, 4000×, and 5000× represent 1000-fold dilution, 2000-fold dilution, 4000-fold dilution, and 5000-fold dilution, respectively.

Table 1 shows, 3 days after spraying, the control efficacy of the acaricides prepared in embodiments 1-5 on citrus red mites (*Panonychus* citri Mcgregor) was 100%, and the control efficacy did not significantly decrease 30 days after spraying. Thus, the results indicate that the acaricide of the present invention has excellent quick-acaricidal effect, excellent effect stability and a long effective period.

The control efficacies of the acaricides prepared in embodiment 3 after being diluted by 1000 folds and 1500 folds on citrus red mites were respectively tested. The control efficacy of the fenpropathrin+hexythiazox (fenpropathrin 5.0%, and hexythiazox 2.5%) diluted 1000 each treatment group in the same orchard. The measurement was repeated 4 times for each treatment group, and the average value of the number of citrus red mites of the 4 groups measured 4 was used as the final result; and water was used as a control. Before spraying, and 3 days and 10 days after spraying, 25 leaves of the sugar orange trees were randomly selected from different parts of the sugar orange trees in each orchard, and the number of live citrus red mites in each treatment group was counted. SPSS 19.0 was used for variance analysis and LSD multiple comparison analysis of the data. The results are shown in Table 2.

TABLE 2

Control efficacy on citrus red mites

| Treatment | Cardinal number before administration | 3rd day Number of mites | 3rd day Control efficacy/% | 10th day Number of mites | 10th day Control efficacy/% |
|---|---|---|---|---|---|
| Acaricide 1000× in Embodiment 3 | 89.75 | 0 | 100aA | 0 | 100aA |
| Acaricide 1500× in Embodiment 3 | 61.75 | 0 | 100aA | 0.5 | 99.3aA |
| Fenpropathrin + hexythiazox 1000× | 83.75 | 24 | 69.4dD | 34.75 | 69.8eD |
| Fenpropathrin + hexythiazox 1000× + acaricide 3000× in Embodiment 3 | 73 | 0 | 100aA | 2.75 | 97.1bA |
| Fenpropathrin + hexythiazox 1000× + acaricide 4000× in Embodiment 3 | 142.75 | 10.5 | 90.6bB | 16.5 | 89.2 cB |
| Fenpropathrin + hexythiazox 1000× + acaricide 5000× in Embodiment 3 | 61.75 | 10 | 83.5cC | 19.75 | 77.0 dC |
| Water control | 83.5 | 81.5 | 2.40eE | 118.25 | 0fE |

Note:
Different lowercase letters in the same column indicate a significant difference ($P < 0.05$), and different uppercase letters in the same column indicate a highly significant difference ($P < 0.01$); 1000×, 1500×, 3000×, 4000×, and 5000× represent 1000-fold dilution, 1500-fold dilution, 3000-fold dilution, 4000-fold dilution, and 5000-fold dilution, respectively.

Table 2 shows, the control efficacies of the 1000-fold diluted solution and the 1500-fold diluted solution of the acaricide prepared in embodiment 3 on citrus red mites, were significantly better than that of the 1000-fold diluted solution of the fenpropathrin+hexythiazox. The control efficacies of the insecticide consisting of a 1000-fold dilution of fenpropathrin+hexythiazox (fenpropathrin 5.0%, hexythiazox 2.5%) and a 3000-fold dilution of the acaricide prepared in embodiment 3, the insecticide consisting of a 1000-fold dilution of fenpropathrin+hexythiazox (fenpropathrin 5.0%, hexythiazox 2.5%) and a 4000-fold dilution of the acaricide prepared in embodiment 3 and the insecticide consisting of a 1000-fold dilution of fenpropathrin+hexythiazox (fenpropathrin 5.0%, hexythiazox 2.5%) and a 5000-fold dilution of the acaricide prepared in embodiment 3 on citrus red mites were significantly better than that of the 1000-fold diluted solution of the fenpropathrin+hexythiazox. Thus, the results indicate that the acaricide of the present invention has an excellent acaricidal effect on citrus red mites, and has a significant synergistic effect on the 1000-fold diluted solution of the fenpropathrin+hexythiazox.

The control efficacies of the acaricides prepared in embodiment 3 after being diluted 1000 folds, 1500 folds, 2000 folds, and 3000 folds on citrus red mites were respectively tested. The control efficacy of the abamectin+fenpropathrin diluted 1000 folds on citrus red mites was tested. The control efficacy of the amitraz diluted 1000 folds on citrus red mites was tested. The control efficacy of the insecticide consisting of a 1000-fold dilution of abamectin+fenpropathrin and a 3000-fold dilution of the acaricide prepared in embodiment 3 on citrus red mites was tested. The control efficacy of the insecticide consisting of a 1000-fold dilution of amitraz and a 3000-fold dilution of the acaricide prepared in embodiment 3 on citrus red mites was tested. The specific test method is as follows. Two red pomelo trees at young fruit stage were randomly selected from each treatment group in the same orchard. The measurement was repeated 4 times for each treatment group, and the average value was used as the final result, with water as a control. Before spraying and 1, 3, and 14 days after spraying, 50 leaves were randomly selected from different parts of the red pomelo trees, and the number of live citrus red mites in each treatment group was counted. SPSS 19.0 was used for variance analysis and LSD multiple comparison analysis of the data. The results are shown in Table 3.

TABLE 3

Control efficacy on citrus red mites

| Treatment | Cardinal number before administration | 1st day Number of mites | 1st day Control efficacy/% | 3rd day Number of mites | 3rd day Control efficacy/% | 14th day Number of mites | 14th day Control efficacy/% |
|---|---|---|---|---|---|---|---|
| Acaricide 1000× in Embodiment 3 | 2344.25 | 0 | 100aA | 0 | 100aA | 0 | 100aA |
| Acaricide 1500× in Embodiment 3 | 2403.75 | 0 | 100aA | 0 | 100aA | 5 | 99.8aA |
| Acaricide 2000× in Embodiment 3 | 2394 | 5.25 | 99.78aA | 6.75 | 99.72aA | 52.75 | 97.8bA |
| Acaricide 3000× in Embodiment 3 | 2305.5 | 16.75 | 99.27aA | 15.25 | 99.34aA | 148.25 | 93.57cB |
| Abamectin + fenpropathrin 1000× | 2529.5 | 261.75 | 89.65bB | 333 | 86.83bB | 1144.75 | 54.74dC |

TABLE 3-continued

| | | 1st day | | 3rd day | | 14th day | |
|---|---|---|---|---|---|---|---|
| Treatment | Cardinal number before administration | Number of mites | Control efficacy/% | Number of mites | Control efficacy/% | Number of mites | Control efficacy/% |
| Amitraz 1000× | 2245.5 | 512.25 | 77.19cC | 821.5 | 63.42cC | 2335.5 | 0eD |
| Abamectin + fenpropathrin 1000× + acaricide 3000× in Embodiment 3 | 2383.75 | 0 | 100aA | 20.5 | 99.25aA | 83.25 | 97.5 |
| Amitraz 1000× + acaricide 3000× in Embodiment 3 | 2416.5 | 0 | 100aA | 0 | 100aA | 75.25 | 97.8bA |
| Water control | 2327 | 2490.5 | 0dD | 2495.5 | 0dD | 3323.25 | 0eD |

Note:
Different lowercase letters in the same column indicate a significant difference (P < 0.05), and different uppercase letters in the same column indicate a highly significant difference (P < 0.01); 1000×, 1500×. 2000×, and 3000× represent 1000-fold dilution, 1500-fold dilution, 2000-fold dilution, and 3000-fold dilution, respectively.

Table 3 shows, the control efficacies of the 1000-fold diluted solution, the 1500-fold diluted solution and the 2000-fold diluted solution of the acaricide prepared in embodiment 3 on citrus red mites were significantly better than that of the 1000-fold diluted solution of the abamectin+fenpropathrin and that of the 1000-fold diluted solution of the amitraz. The control efficacy of the insecticide consisting of a 1000-fold dilution of abamectin+fenpropathrin and a 3000-fold dilution of the acaricide prepared in embodiment 3 on citrus red mites was tested and was significantly better than that of the 1000-fold diluted solution of the abamectin+fenpropathrin. The control efficacy of the insecticide consisting of a 1000-fold dilution of amitraz and a 3000-fold dilution of the acaricide prepared in embodiment 3 on citrus red mites was significantly better than that of the 1000-fold diluted solution of the amitraz. Thus, the results indicated that the acaricide of the present invention has an excellent acaricidal effect on citrus red mites, and has a significant synergistic effect on the 1000-fold diluted solution of the abamectin+fenpropathrin and the 1000-fold diluted solution of the amitraz.

The control efficacies of the 1500-fold diluted solutions of the acaricides prepared in embodiments 1-5 on two-spotted spider mites were respectively tested. Ten cowpea seedlings were randomly selected from each orchard, and each treatment group was repeatedly tested 4 times. The average value was used as the final result, with water as a control. Before spraying and 1, 3, and 14 days after spraying, 50 leaves were randomly selected from different parts of the cowpea seedlings in each orchard, and the number of live mites in each treatment group was counted. SPSS 19.0 was used for variance analysis and LSD multiple comparison analysis of the data. The results are shown in Table 4.

TABLE 4

| | | 1st day | | 3rd day | | 14th day | |
|---|---|---|---|---|---|---|---|
| Treatment | Cardinal number before administration | Number of mites | Control efficacy/% | Number of mites | Control efficacy/% | Number of mites | Control efficacy/% |
| Acaricide 1500× in Embodiment 1 | 428.25 | 0 | 100aA | 2.5 | 99.42aA | 0 | 100aA |
| Acaricide 1500× in Embodiment 2 | 457.5 | 2.5 | 99.45aA | 0 | 100aA | 2.5 | 99.45aA |
| Acaricide 1500× in Embodiment 3 | 512.75 | 0 | 100aA | 0 | 100aA | 0 | 100aA |
| Acaricide 1500× in Embodiment 4 | 398.5 | 3.5 | 99.12aA | 0 | 100aA | 1.5 | 99.62aA |
| Acaricide 1500× in Embodiment 5 | 385.25 | 0 | 100aA | 1.5 | 99.61aA | 0 | 100aA |
| Water control | 378.75 | 372.25 | 0bB | 413.5 | 0bB | 452.5 | 0bB |

Note:
Different lowercase letters in the same column indicate a significant difference (P < 0.05), and different uppercase letters in the same column indicate a highly significant difference (P < 0.01); 1500× represents 1500-fold dilution.

Table 4 shows, three days after spraying the 1500-fold diluted solution of the acaricide of the present invention, the control efficacies of the acaricides on two-spotted spider mites reached 99.42%-100%. Thus, the results indicate that the acaricide of the present invention has a quick effect on two-spotted spider mites, and has an excellent acaricidal effect.

The control efficacies of the 1000-fold diluted solutions of the acaricides prepared in embodiments 1-5 against mite injury on goats were tested. In the same farm, 60 goats with typical clinical symptoms of mite disease were selected after clinical symptoms observation and microscopy, and the hair of all the test goats was cut off. Ten goats were randomly selected from each treatment group, and the acaricides with corresponding dilution were evenly smeared on the whole body of each goat; water was used as a control. The goats were fed separately. On the $3^{rd}$, $7^{th}$, and $30^{th}$ days after the treatment, the dander was scraped from the back, buttocks and head of the goats with a sterilized convex knife for treatment and microscopy. The specimens were observed under a microscope. The mites are dead if their limbs do not move or the mite bodies are deformed, which is judged as negative; otherwise positive. If no live mite bodies are found, and no itchy and restless symptoms are found on the back, buttocks and head of the affected goats, it is regarded as a cure. Negative conversion rate of mite bodies=Number of goats with negative mite bodies/Number of experimental goats in the same group×100%. Cure rate of mite disease=Number of cured goats affected by mite disease/Number of experimental goats in the same group×100%. The results are shown in Table 5.

times respectively on lettuce downy mildew were tested. The control efficacies of the insecticides consisting of 3000-fold diluted solutions of the acaricides prepared in embodiments 1-5 and 600-fold diluted solution of the 72% cymoxanil+mancozeb applied once on lettuce downy mildew were tested. The treatment area of each treatment group in the same vegetable garden is 3×3 $m^2$. The measurement was repeated 5 times, and the average value was used as the final result, with water as a control. Each treatment group was sprayed with 7600-fold diluted solution of the 72% cymoxanil+mancozeb once, twice, and three times, and the interval was 7 days. The insecticides consisting of 3000-fold diluted solutions of the acaricides prepared in embodiments 1-5 and 600-fold diluted solution of the 72% cymoxanil+mancozeb were sprayed once. The front and back sides of the lettuce leaves were sprayed evenly each time, and water was used as a control. 21 days after the first spraying, 5 lettuce plants were randomly selected from each orchard, and 5 leaves of each plant were checked from bottom to top. Each leaf was graded according to the percentage of the leaf area occupied by the disease spots, and the disease index and control efficacy were calculated. The grading standards are as follows: grade 0 is no disease spots; grade 1 is the diseased area accounting for less than 5% of the entire leaf area; grade 3 is the diseased area accounting for 6% -10% of the entire leaf area; grade 5 is the diseased area accounting for 11% -25% of the entire leaf area; grade 7 is the diseased area accounting for 26% -50% of the entire leaf area; and grade

TABLE 5

Control efficacy on citrus red mites

| Treatment | $3^{rd}$ day | | $7^{th}$ day | | $30^{th}$ day | |
| --- | --- | --- | --- | --- | --- | --- |
| | Negative conversion rate of mite bodies % | Cure rate % | Negative conversion rate of mite bodies % | Cure rate % | Negative conversion rate of mite bodies % | Cure rate % |
| Acaricide 1000× in Embodiment 1 | 80 | 0 | 100 | 0 | 100 | 100 |
| Acaricide 1000× in Embodiment 2 | 70 | 10 | 100 | 0 | 100 | 100 |
| Acaricide 1000× in Embodiment 3 | 90 | 0 | 100 | 0 | 100 | 100 |
| Acaricide 1000× in Embodiment 4 | 70 | 0 | 100 | 0 | 100 | 90 |
| Acaricide 1000× in Embodiment 5 | 70 | 10 | 100 | 0 | 100 | 100 |
| Water control | 0 | 0 | 0 | 0 | 0 | 0 |

Note:
1000× represents 1000-fold dilution.

Table 5 shows, 30 days after an application of the 1000-fold diluted solution of the acaricide of the present invention, the negative conversion rate of mite bodies reached 100% within 7 days, and the cure rate reached 90%-100% on average in 30 days. Thus, the results indicate that the acaricide of the present invention has an excellent acaricidal effect on goat mite injury.

The control efficacies of 600-fold diluted solution of the 72% cymoxanil+mancozeb applied once, twice and three 9 is the diseased area accounting for more than 50% of the entire leaf area. Disease index=(ΣNumber of diseased leaves of disease grade×Value of the disease grade)/(Total number of leaves investigated×Value of highest disease grade). Relative control efficacy (%)=[(Disease index of control area−Disease index of treatment area)/Disease index of control area]×100%. SPSS 19.0 was used for variance analysis and LSD multiple comparison analysis of the data. The results are shown in Table 6.

TABLE 6

Control efficacy on lettuce downy mildew

| Treatment | Disease index | Relative control efficacy/% |
|---|---|---|
| 72% Cymoxanil + mancozeb 600× (applied once) | 59 | 0cC |
| 72% Cymoxanil + mancozeb 600× (applied twice) | 28.4 | 51.0bB |
| 72% Cymoxanil + mancozeb 600× (applied three times) | 4.8 | 91.7aA |
| Acaricide 3000× in Embodiment 1 + 72% Cymoxanil + mancozeb 600× | 2.8 | 95.2aA |
| Acaricide 3000× in Embodiment 2 + 72% Cymoxanil + mancozeb 600× | 5.7 | 90.2aA |
| Acaricide 3000× in Embodiment 3 + 72% Cymoxanil + mancozeb 600× | 3.1 | 94.7aA |
| Acaricide 3000× in Embodiment 4 + 72% Cymoxanil + mancozeb 600× | 4.2 | 92.8aA |
| Acaricide 3000× in Embodiment 5 + 72% Cymoxanil + mancozeb 600× | 4.5 | 92.2aA |
| Water control | 58 | 0cC |

Note:
Different lowercase letters in the same column indicate a significant difference ($P < 0.05$), and different uppercase letters in the same column indicate a highly significant difference ($P < 0.01$); 600× and 3000× represent 600-fold dilution and 3000-fold dilution, respectively.

Table 6 shows, insecticide consisting of 3000-fold diluted solutions of the synergistic agents (acaricides) prepared in embodiments 1-5 and 600-fold diluted solution of the 72% cymoxanil+mancozeb only needs to be sprayed once to prevent the lettuce downy mildew to achieve the control efficacy of 600-fold diluted solution of the 72% cymoxanil+mancozeb sprayed three times, which is significantly better than the control efficacies of 72% cymoxanil+mancozeb sprayed once or twice. Thus, the results indicate that the synergistic agent of the present invention can significantly improve the control efficacy of some fungicides such as 72% cymoxani+mancozeb on the lettuce downy mildew.

By using the glass slide method, the effects of the 1500-fold diluted solution and the 3000-fold diluted solution of the acaricide prepared in embodiment 3, the 1500-fold diluted solution of the ethoxy-modified trisiloxane, and the 1500-fold diluted solution of the solid sodium dioctyl sulfosuccinate prepared in embodiment 1 on the adult citrus red mites (Panonychus citri Mcgregor) were tested. Each treatment group had 50 citrus red mites, and the measurement was repeated 4 times, with water as a control. The number of live mites in each treatment group was counted at 10 minutes and again 72 hours after spraying, and the average value was used as the final result. SPSS 19.0 was used for variance analysis and LSD multiple comparison analysis of the data. The results are shown in Table 7.

TABLE 7

Effect on adult citrus red mites

| Treatment | Mortality after 10 minutes/% | Mortality after 72 hours/% |
|---|---|---|
| Ethoxy-modified trisiloxane 1500× | 15.42dD | 28.84dD |
| Solid sodium dioctyl sulfosuccinate prepared in Embodiment 1 1500× | 20.35cC | 62.45cC |
| Acaricide prepared in Embodiment 3 1500× | 64.85aA | 96.88aA |
| Acaricide prepared in Embodiment 3 3000× | 38.46bB | 80.42bB |

Note:
Different lowercase letters in the same column indicate a significant difference ($P < 0.05$), and different uppercase letters in the same column indicate a highly significant difference ($P < 0.01$); 1500× and 3000× represent 1500-fold dilution and 3000-fold dilution, respectively.

Table 7 shows, compared with the 1500-fold diluted solution of ethoxy-modified trisiloxane and the 1500-fold diluted solution of sodium dioctyl sulfosuccinate prepared in embodiment 1, the mortality of adult citrus red mites treated with the 1500-fold diluted solution and the 3000-fold diluted solution of the acaricide prepared in embodiment 3 for 10 minutes and 72 hours was significantly increased. Thus, the results indicate that the acaricide of the present invention can significantly improve the acaricidal effect.

The effects of the 1200-fold diluted solutions of the acaricides prepared in embodiments 1-5 on the citrus red mites (*Panonychus* citri Mcgregor) were tested. In vitro, citrus leaf culture method was used, the leaves were collected from the same healthy citrus tree; each citrus leaf was artificially inoculated with 20 female adult mites, each group treated with 5 leaves; and the measurement was repeated 4 times, with the average value as the final result. After culturing for 1 week, the leaves were immersed in the 1200-fold diluted solutions of the acaricides prepared in embodiments 1-5 for 3 seconds, with water as a control. After the surfaces of the leaves were dried, the culturing was continued for 1 week, and the number of citrus red mites and the number of eggs were counted under an anatomical microscope. SPSS 19.0 was used for variance analysis and LSD multiple comparison analysis of the data. The results are shown in Table 8.

TABLE 8

Effect on citrus red mites

| | Number of mites | Number of eggs |
|---|---|---|
| Acaricide 1200× in Embodiment 1 | 9.46bB | 1.45bB |
| Acaricide 1200× in Embodiment 2 | 8.64bB | 1.85bB |
| Acaricide 1200× in Embodiment 3 | 1.56aA | 0.25aA |
| Acaricide 1200× in Embodiment 4 | 7.37bB | 1.85bB |
| Acaricide 1200× in Embodiment 5 | 7.25bB | 1.65bB |
| Water control | 97.5cC | 58.8cC |

Note:
Different lowercase letters in the same column indicate a significant difference ($P < 0.05$), and different uppercase letters in the same column indicate a highly significant difference ($P < 0.01$); 1200× represents 1200-fold dilution.

Table 8 shows, the acaricide of the present invention has an excellent exterminating effect on the citrus red mites and their eggs.

In addition, it should be understood that although the present specification is described in terms of embodiments, but not each embodiment includes merely an independent technical solution. The foregoing description of the specification is merely for the sake of clarity. Those skilled in the art shall take the specification as a whole, and the technical solutions in each embodiment may be appropriately combined to form other implementations understandable to those skilled in the art.

What is claimed is:

1. An acaricide, consisting of an ethoxy-modified trisiloxane and sodium dioctyl sulfosuccinate.

2. The acaricide according to claim 1, wherein, a mass ratio of the ethoxy-modified trisiloxane to the sodium dioctyl sulfosuccinate ranges from (1:2) to (1:0.5).

3. The acaricide according to claim 1, wherein, a mass ratio of the ethoxy-modified trisiloxane to the sodium dioctyl sulfosuccinate ranges from (1:1.2) to (1:0.8).

4. A method for applying the acaricide according to claim 1, comprising: applying the acaricide for exterminating mites.

5. The method according to claim 4, wherein, a mass ratio of the ethoxy-modified trisiloxane to the sodium dioctyl sulfosuccinate is 1:0.5-2.

6. The method according to claim 4, wherein, a mass ratio of the ethoxy-modified trisiloxane to the sodium dioctyl sulfosuccinate ranges from (1:1.2) to (1:0.8).

7. The method according to claim 4, wherein, a mass ratio of the ethoxy-modified trisiloxane to the sodium dioctyl sulfosuccinate is 1:0.5-2.

* * * * *